Oct. 21, 1958 O. C. JORGENSEN ET AL 2,857,517

FREQUENCY DISCRIMINATOR

Filed June 14, 1957

INVENTOR.
OTTO C. JORGENSEN
LEWIS D'ANDREANO
BY WILLIAM L. BRUNE

Richard G. Stahr
ATTORNEY

United States Patent Office 2,857,517

Patented Oct. 21, 1958

2,857,517

FREQUENCY DISCRIMINATOR

Otto C. Jorgensen, Lewis D. D'Andreano, and William L. Brune, Rochester, N. Y., assignors to General Dynamics Corporation, Rochester, N. Y., a corporation of Delaware Application June 14, 1957, Serial No. 665,736

5 Claims. (Cl. 250—31)

Figure 1:
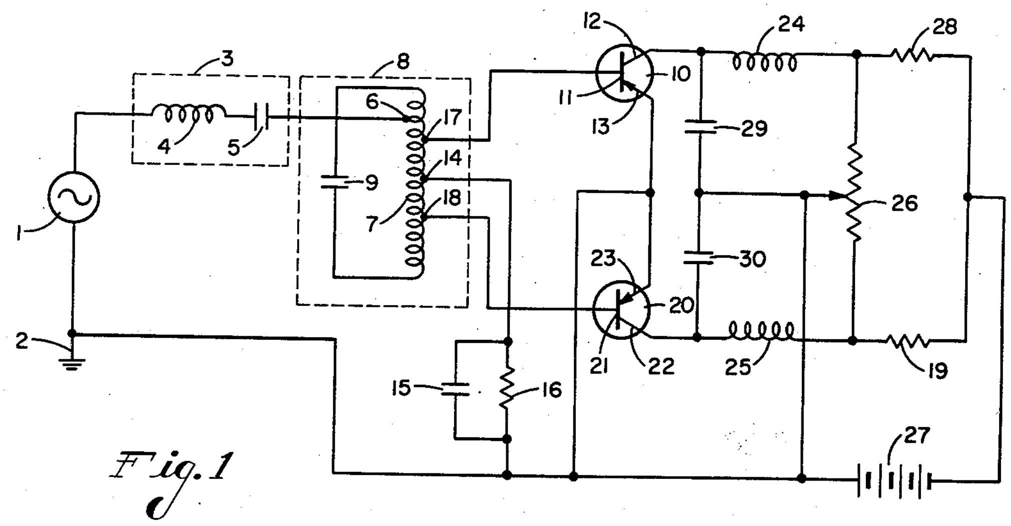

The present invention relates to frequency discriminator circuits and, more specifically, to discriminator circuits which are insensitive to impulses or signals of a frequency above or below a selected band.

Certain applications may require a discriminator which is responsive to input signals which are of a frequency within a relatively narrow selected band and which is insensitive to signals or impulses of a frequency above or below the selected range. For purposes of illustration only, and in no way intending or inferring that the present invention be restricted thereto, an example of an application which requires a discriminator possessing these characteristics is in the wired carrier telephony signalling circuit art. In this instance, direct current dial impulses are converted to frequency modulated signals at the transmitter, usually by a frequency shift oscillator, and are reconverted from frequency modulated signals to similar direct current pulses at the receiver through the medium of a disciminator circuit. It is apparent, therefore, that a discriminator which is insensitive to frequencies above or below the signalling band is of utmost importance so that false impulses or line transients be ignored.

To achieve the proper signal selectivity in this application, thus preventing spurious operation of the receiver signal equipment, it has been generally found necessary to precede conventional diode-type discriminators with band pass filters in addition to the tuned transformer coupling and phase discrimination networks which are also a requisite of this type discriminator.

In the interest of space preservation, the aforementioned frequency shift oscillators have been, to a large extent, transistorized with the resulting reduction of available oscillator output power. Because of the small magnitudes of power involved, power losses through conventional diode-type discriminators, the associated band pass filters and the tuned transformer coupling and discriminating networks can no longer be disregarded. Therefore, an additional stage of direct current amplification generally has been required to provide output power of sufficient magnitude to operate the receiver signal equipment. As the gain of this stage must be of necessity very high, the problem of designing a sufficiently stable stage of direct current amplification has been practically insurmountable.

For these reasons, it has been found desirable to develop a more efficient discriminator circuit which will reduce the filtering and coupling network requirements to a minimum, thereby reducing overall power loss, and which will have a certain inherent amplification factor, thereby eliminating the requirement of an additional stage of direct current amplification.

It is an object of this invention to provide an improved discriminator circuit which will obviate the disadvantages of the prior art.

It is another object of this invention to provide a discriminator circuit which will eliminate the requirement of an additional direct current power amplifier.

It is another object of this invention to provide a discriminator circuit which is sharply selective in response and which will minimize overall power loss.

In accordance with this invention, a series tuned circuit and a parallel tuned circuit form a combined filter and frequency discriminator network wherein the resultant phase of the voltages applied to the respective input electrodes of a pair of wave translating devices is a function of the deviations of the frequency modulated input above or below a center frequency.

Figures 2, 3:
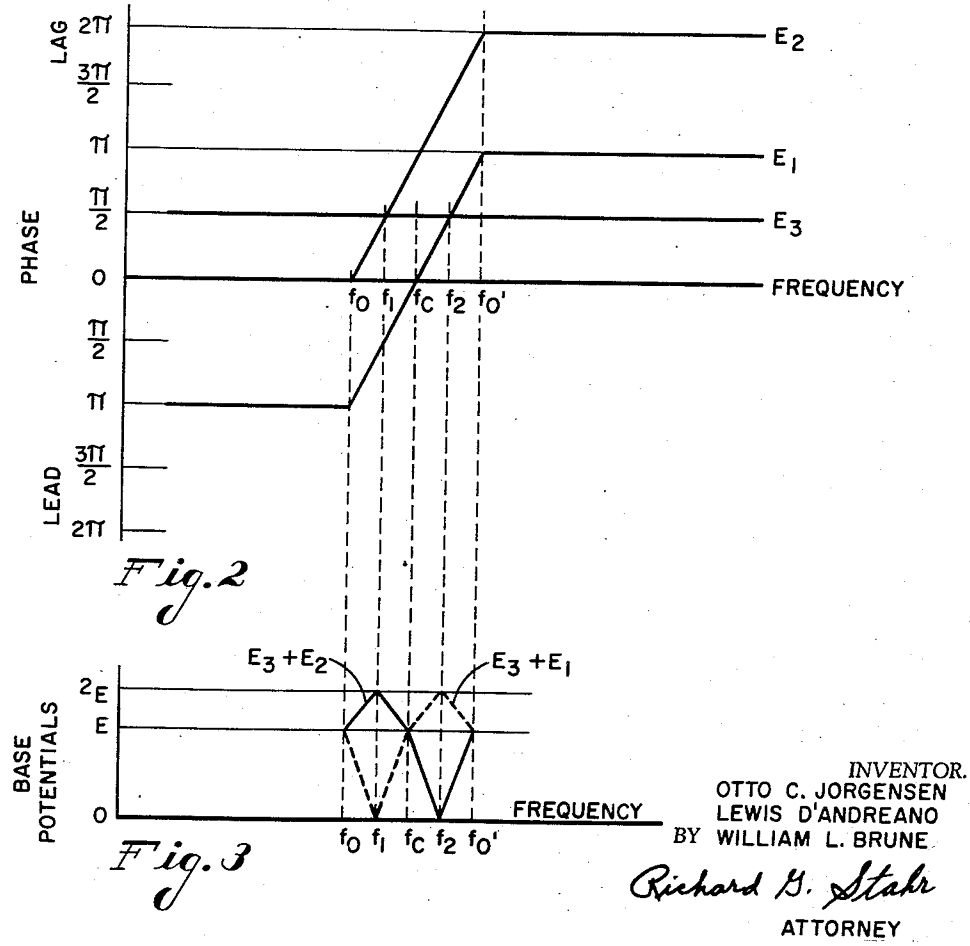

For a better understanding of the present invention, together with further objectives, advantages, and features thereof, reference is made to the following description and accompanying drawing, in which:

Figure 1 of the drawing is a preferred embodiment of this invention,

Figure 2 is a graphic illustration of the shift of the phase of the input potential through the discriminator network with a change in frequency, Figure 3 is a graphic illustration of the voltages applied to the respective input electrodes.

While the present description is in reference to the application of this invention to a wired carrier telephony signalling circuit, it should be specifically understood that the invention may be used with any wave translation system in which frequency discrimination is desired.

In Figure 1, a signal generator is indicated at 1. As this generator forms no part of the invention, it is being referred to only for the purpose of identification. A detailed description of this element is deemed unnecessary for the purposes of this specification except to point out that it may be any source of signal energy such as an oscillator, a prior stage of an electronic wave translating system or a transmission line.

The output of signal generator 1 is connected between a point of reference potential 2 which may be grounded and a series inductance-capacitance tuned circuit 3 which consist of the series combination of inductor 4 and capacitor 5. The other side of capacitor 5 is connected to a point 6 along a center tapped inductor 7 which is an element of a parallel resonant inductance-capacitance circuit 8, comprised of the parallel combination of inductor 7 and capacitor 9. Both of these resonant circuits are tuned to the same selected frequency, hereinafter referred to as the center frequency. The connection point 6, along inductor 7, may be determined by the impedance of generator 1, so that the connection point 6 is located at a point which will match the impedances of the generator 1, the series resonant circuit 3, and the parallel resonant circuit 8. The center tap 14 of inductor 7 is reactively connected to the point of reference potential 2 through capacitor 15. Resistor 16, shunted across capacitor 15, provides a direct current path around capacitor 15 to the point of reference potential 2. As it is necessary to reactively connect center tap 14 to point of reference potential 2, for reasons which will be explained later, capacitor 15 may be replaced by an inductor, in which instance, resistor 16 would be unnecessary. The bases 11 and 21 of transistors 10 and 20 are connected to points 17 and 18, respectively, along inductor 7 and on opposite sides of the center tap. The locations of the points 17 and 18 are determined by the magnitudes of input voltage which is to be impressed upon the respective bases.

The circuit which has been described forms a combined filter and frequency discriminator network which renders input frequencies above or below a selected range ineffective and wherein the resultant phase of the voltages applied to the respective bases 11 and 21 of transistors 10 and 20 is a function of the deviations of the frequency modulated input above or below the center frequency. From this network, potentials are developed at points 17 and 18 and a third potential is developed at center tap 14 across capacitor 15, all in respect to point of reference potential 2.

Considering first the potentials developed at points 17 and 18 and assuming for the present that point 14 be connected directly to point of reference potential 2, the phase relationship of the potentials at points 17 and 18, in respect to the potential across the generator 1, as the input frequency increases is graphically illustrated in Figure 2 where $E_1$ is the potential at point 17 and $E_2$ is the potential at point 18. At the lower input frequencies, series tuned circuit 3 is capacitive while parallel tuned circuit 8 is inductive. As each of these circuits produce a phase shift of 90°, the potential at point 17, $E_1$, is leading the generator potential by 180°, as indicated. Because the potential at point 18, $E_2$, is developed at a point on the opposite side of the grounded center tap of inductor 7, $E_2$ is 180° out of phase with $E_1$ and in phase with the generator potential. As the input frequency increases, this phase relationship does not change until a frequency $f_0$, just below the center frequency $f_c$, is reached. At this point, the phase of $E_1$ will begin to change and, as the input frequency increases beyond $f_0$, will gradually shift from lead to lag, in respect to the generator potential, until it is in phase with the generator potential at the center frequency $f_c$. As the center frequency $f_c$ is passed, the phase of $E_1$, in respect to the generator potential, continues to shift until a frequency of $f'_0$ above the center frequency $f_c$ is reached where $E_1$ lags the generator potential by 180°. At this point, the phase shift levels and remains relatively flat as the input frequency increases beyond this point. By virtue of the fact that $E_2$ is developed at a point on the opposite side of the center tap of a center tapped inductor 7, it remains 180° out-of-phase in respect to $E_1$ throughout this transition. Therefore, the phase shift takes place over a narrow frequency band and the change is very nearly linear.

Considering now the potential developed at point 14, indicated as $E_3$ in Figure 2, with the direct connection between point 14 and point of reference potential 2 replaced by capacitor 15 and resistor 16, as shown in Figure 1, the phase relationship of $E_3$, which is 90° out-of-phase with the generator potential because of the reactive connection between center tap 14 and point of reference potential 2, does not change appreciably over this frequency range because of the nearly pure capacity of the capacitor 15.

Through the addition of $E_3$, by inserting a reactive connection between point 14 and point of reference potential 2, therefore, there is developed three separate potentials which are in a phase quadrature relationship producing upon the respective bases resultant potentials with a change in input frequency.

Referring again to Figure 1, it is apparent that the transistors 10 and 20 are connected as amplifiers. The negative terminal of a supply source 27 is connected to the respective collectors 12 and 22, in parallel, through series resistors 28 and 19 while the respective emitters 13 and 23 are connected to the point of reference potential 2. N–P–N transistors may also be used in this discriminator with a reversal of the relative electrode polarities. Also shown in the figure are coils 24 and 25 in the respective collector circuits and potentiometer 26 shunted across the collectors with the wiper arm connected to point of reference potential 2. Capacitors 29 and 30 are inserted to provide a filter network which will tend to smooth out the direct current output potentials.

Coils 24 and 25 constitute the two windings of a polarized direct current relay, the movable contact of which is designed to operate in either one of two directions, in response to a differential current flow through the coils. Equal current flow through both coils is ineffective to operate this relay while an unbalanced current flow through the coils will operate the movable contact in one direction or the other, dependent upon the coil which carries the larger magnitude of current.

In the application for illustrating the operation of this invention, the discriminator is employed for the purpose of reconverting frequency modulated signals into direct current pulses which will operate this polarized relay in one direction in response to a selected signal frequency below the center frequency and in the other direction in response to a selected signal frequency above the center frequency. An ideal discriminator for this application, therefore, would provide unbalanced current flow through coils 24 and 25 at the two signal frequencies, the degree of unbalance being in favor of either coil at the lower signal frequency and the other coil at the higher signal frequency, and a balanced current flow through both coils at all other frequencies.

Since the output of a transistor is proportional to the input, input potentials of equal magnitude applied to the respective bases 11 and 21 of transistors 10 and 20 produces equal output potentials, assuming the impedances of the respective output circuits to be equal, thereby resulting in equal current flow through both relay coils as they are connected in series in the respective collector circuits. Therefore, to produce the required operation of the polarized relay for this application, the input potentials applied to the respective bases 11 and 21 must be equal at all frequencies except the signalling frequencies. At the signal frequencies, on the other hand, the respective inputs must be unequal to produce the required output unbalance in favor of one coil or the other.

Assuming $E_1$, $E_2$ and $E_3$ to be of the same magnitude, representing the generator signal by E volts and taking the vector sums of $(E_3+E_1)$ and $(E_3+E_2)$, the magnitudes of the resultant potentials applied to bases 11 and 21, respectively, as the generator frequency increases are graphically illustrated in Figure 3. From this illustration, it is apparent that the input potentials applied to the respective bases are equal at all generator frequencies, except those frequencies falling within the narrow range between $f_0$—$f_c$ and $f_c$—$f'_0$. Further, it may be also seen that at the low signal frequency $f_1$, the input potential applied to base 21 is at a maximum while the input potential to base 11 is zero and at the high signal frequency $f_2$, the input potential applied to base 11 is at a maximum and the input potential to base 21 is zero.

Assuming for the moment that the respective output impedances are equal and that the gain of the respective transistors is the same, equal input potentials applied to the respective bases will produce equal output potentials since the output is proportional to the input. Equal output potentials will produce equal currents in the respective output circuits and, hence, equal current flow through the respective relay coils 24 and 25 in that these coils are inserted in series in the respective collector circuits. As has been brought out before, the polarized relay used in this circuit is not operated by equal current flow through both its coils. Therefore, all input frequencies which produce equal input potentials are ineffective to operate this relay. In this invention, this condition is realized at all input frequencies except the signal frequencies, a requisite for this illustrative application. At the low signal frequency, the input potential to base 21 is a maximum while the input potential to base 11 is zero. The resulting unbalanced output produces a larger magnitude of current flow through coil 25 than through coil 24, thereby operating the relay in one direction. At the higher signal frequency, the reverse is true, thereby operating the relay in the opposite direction.

Since the assumption of equal output impedances and equal gains through different transistors can rarely, if ever, be realized in practice, potentiometer 26 has been inserted across the respective collectors with the wiper arm returned to point of reference potential 2. In this manner, a voltage divider circuit is provided by which the relative magnitudes of B— potential applied to the respective collector may be selectively adjusted to compensate for any inherent component inequalities, thereby selecting proper current balance through the coils 24 and 25.

While I have shown and described a preferred embodiment of my invention, it will be obvious to those skilled in the art that various modifications and substitutions may be made without departing from the spirit of this invention which is to be limited only within the scope of the appended claims.

What is claimed is:

1. A discriminator comprising, a pair of wave translating devices having at least input and output electrodes, output circuits associated with said output electrodes, a source of supply potential, means for connecting said source of supply potential to said devices, a point of reference potential, a series resonant inductance-capacitance network, a parallel resonant inductance-capacitance network having a center tapped inductor, means for reactively connecting said center tap to said point of reference potential, means for connecting a selected end of said series resonant circuit to said center tapped inductor and means for connecting said input electrodes to respective points on said center tapped inductor on opposite sides of said center tap.

2. A discriminator comprising a pair of transistor devices having at least input and output electrodes, output circuits associated with said output electrodes, a source of supply potential, means for connecting said source of supply potential to said devices, a point of reference potential, a series resonant inductance-capacitance network, a parallel resonant inductance-capacitance network having a center tapped inductor, means for reactively connecting said center tap to said point of reference potential, means for connecting a selected end of said series resonant circuit to said center tapped inductor and means for connecting said input electrodes to respective points on said center tapped inductor on opposite sides of said center tap.

3. A discriminator comprising, a pair of wave translating devices having at least input and output electrodes, output circuits associated with said output electrodes, a source of supply potential, means for connecting said source of supply potential to said devices, a point of reference potential, a series resonant inductance-capacitance network, a parallel resonant inductance-capacitance network having a center tapped inductor, means for reactively connecting said center tap to said point of reference potential, means for connecting a selected end of said series resonant circuit to said center tapped inductor, means for adjustably selecting the relative magnitudes of supply potential to the respective output electrodes and means for connecting said input electrodes to respective points on said center tapped inductor on opposite sides of said center tap.

4. A discriminator comprising, a pair of transistor devices having at least base, emitter and collector electrodes, output circuits associated with said collector electrodes, a source of supply potential, means for connecting said source of supply potential to said devices, a point of reference potential, a series resonant inductance-capacitance network, a parallel resonant inductance-capacitance network having a center tapped inductor, means for reactively connecting said center tap to said point of reference potential, means for connecting a selected end of said series resonant circuit to said center tapped inductor, means for connecting said emitter electrodes to said point of reference potential and means for connecting said base electrodes to repective points on said center tapped inductor on opposite sides of said center tap.

5. A discriminator comprising, a pair of transistor devices having at least base, emitter and collector electrodes, output circuits associated with said collector electrodes, a source of supply potential, means for connecting said source of supply potential to said devices, a point of reference potential, a series resonant inductance-capacitance network, a parallel resonant inductance-capacitance network having a center tapped inductor, means for reactively connecting said center tap to said point of reference potential, means for connecting a selected end of said series resonant circuit to said center tapped inductor, means for connecting said emitter electrodes to said point of reference potential, means for adjustably selecting the relative magnitudes of supply potential to the respective collector electrodes and means for connecting said base electrodes to respective points on said center tapped inductor on opposite sides of said center tap.

References Cited in the file of this patent

UNITED STATES PATENTS

| | | |
|---|---|---|
| 2,156,376 | Crosby | May 2, 1939 |
| 2,251,064 | Martin | July 29, 1941 |
| 2,265,826 | Wheeler | Dec. 9, 1941 |
| 2,374,734 | Crosby | May 1, 1945 |
| 2,376,127 | Crosby | May 15, 1945 |
| 2,606,250 | Mackey | Aug. 5, 1952 |
| 2,698,392 | Herman | Dec. 28, 1954 |